Figure 1:
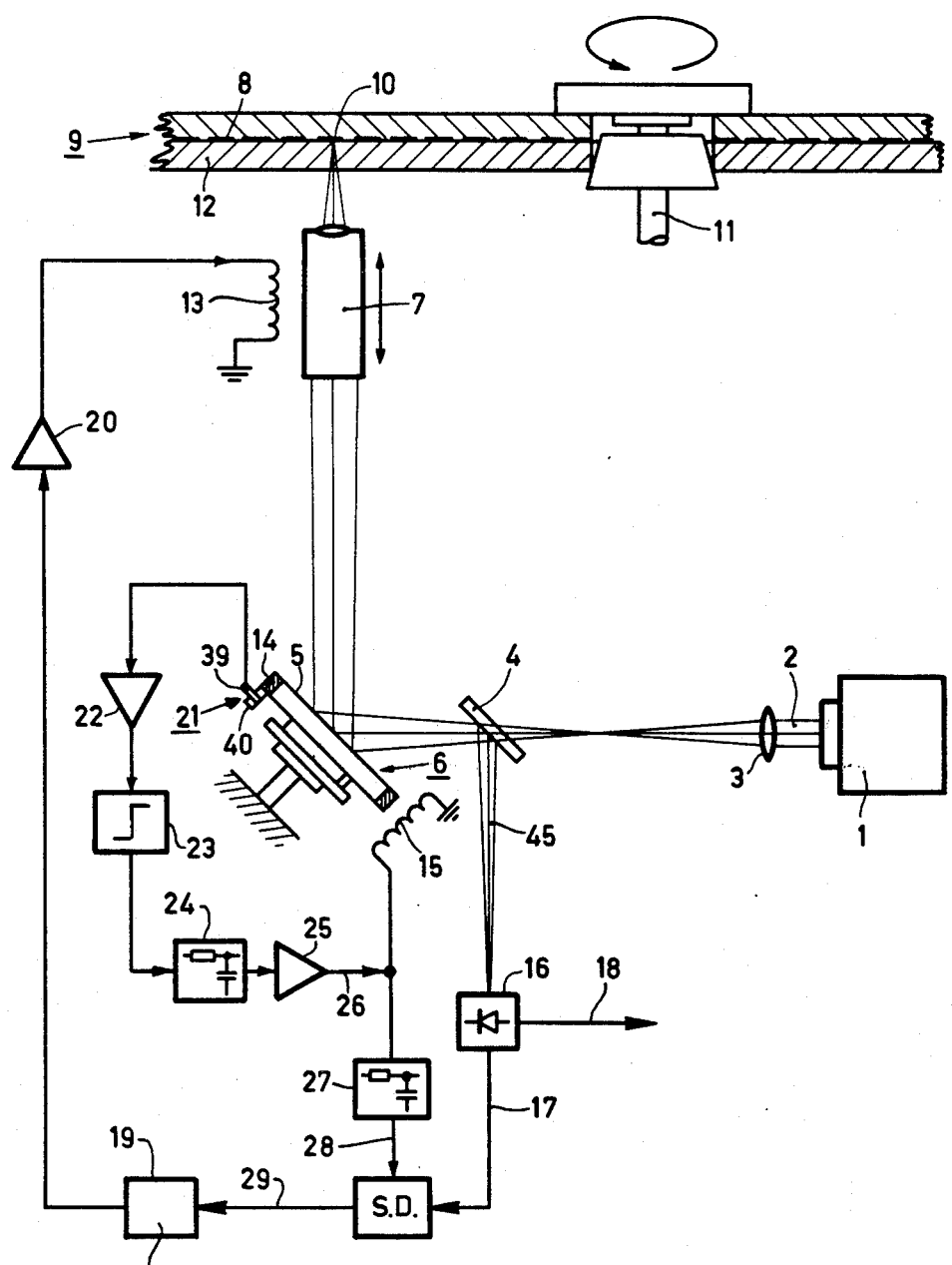

United States Patent
van Rosmalen

[11] 4,074,312
[45] Feb. 14, 1978

[54] AUTOMATIC DITHERING OPTICAL FOCUSING SYSTEM USING AN OSCILLATING MIRROR IN THE PATH OF THE RADIATION BEAM

[75] Inventor: Gerard Eduard van Rosmalen, Eindhoven, Netherlands

[73] Assignee: U.S. Philips Corporation, New York, N.Y.

[21] Appl. No.: 662,456

[22] Filed: Mar. 1, 1976

[30] Foreign Application Priority Data

Jan. 19, 1976 Netherlands .................... 7600479

[51] Int. Cl.² ............................................. G11B 11/00
[52] U.S. Cl. .................................... 358/128; 250/201; 179/100.3 V
[58] Field of Search ............... 178/6.6 R, 6.6 P, 6.7 A, 178/6.7 R; 179/100.3 V, 100.4 R, 100.4 M; 350/255, 295; 250/201; 358/128

[56] References Cited

U.S. PATENT DOCUMENTS

| | | | |
|---|---|---|---|
| 3,673,412 | 6/1972 | Olson | 250/201 |
| 3,825,323 | 7/1974 | Landwer | 350/255 |
| 3,854,015 | 12/1974 | Janssen | 179/100.3 V |
| 3,876,875 | 4/1975 | Velzel | 250/201 |
| 3,932,700 | 1/1976 | Snopko | 179/100.3 V X |
| 3,952,191 | 4/1976 | Tinet | 250/201 |
| 3,974,327 | 8/1976 | Van Dijk | 179/100.3 V X |
| 3,985,952 | 10/1976 | Adler | 178/6.6 R |
| 3,991,275 | 11/1976 | Bulthuis | 178/6.6 R |
| 3,999,008 | 12/1976 | Bouwhuis et al. | 358/128 |

*Primary Examiner*—John H. Wolff
*Attorney, Agent, or Firm*—Frank R. Trifari; Simon L. Cohen

[57] ABSTRACT

An automatic optical focusing system suitable for an apparatus for reading an information track on a record carrier with the aid of a read spot which is focused in an imaginary focusing plane and which is formed by a radiation beam which is produced by a radiation source, more in particular suitable for a video disc player which employs optical reading, and serving for automatically keeping the read spot focused at the plane in which the information is disposed (information plane) during playing of a record carrier, comprising an optical focusing device, an oscillating optical element which cooperates with the radiation beam and which can effect high-frequency oscillations so that a high frequency oscillation of small amplitude about the coarse position of the focusing plane is obtained, an electromagnetic drive system for the high-frequency drive of the oscillating optical element, a radiation-sensitive detector which responds to the radiation beam which has been modulated by the information track, and a control circuit for producing a control signal which depends on the output signal of the detector, which control signal is applied to the control coil of the optical focusing device. The oscillating optical element is constituted by an oscillating mirror which reflects the radiation beam which mirror effects high-frequency bending oscillations of which at least a component has the direction of the reflected part of the radiation beam. Preferably, the oscillating mirror is round and effects high frequency bending oscillations between a convex and a concave shape.

9 Claims, 4 Drawing Figures

AUTOMATIC DITHERING OPTICAL FOCUSING SYSTEM USING AN OSCILLATING MIRROR IN THE PATH OF THE RADIATION BEAM

The invention relates to an automatic optical focusing system suitable for an apparatus for reading an information track on a record carrier with the aid of a read spot which is focused in an imaginary focusing plane and which is formed by a beam of radiation produced by a radiation source. The invention is more in particular suitable for a video disc player which employs optical reading, and serving for automatically keeping the read spot focused at the plane in which the information is located (information plane) while a record carrier is being played, comprising: an optical focusing device for focusing the radiation beam to a read spot in the focusing plane and comprising a frame, an electrically controllable objective provided with lenses, which is axially movable relative to the frame in the direction of its optical axis for varying the position of the focusing plane. Mounted on the frame are an electrodynamic drive means which comprise at least a control coil for axially moving the objective and thus controlling the coarse position of the focusing plane, an oscillating optical element which cooperates with the radiation beam, which element is capable of effecting high-frequency oscillations so that a high frequency oscillation with small amplitude about the coarse position of the focusing plane is obtained, an electrodynamic drive system for driving the oscillating optical element with high frequency and comprising at least a magnet and a drive coil, a radiation-sensitive detector which responds to the radiation beam which has been modulated by the information track for producing a detection signal depending on the position of the focusing plane relative to the information plane, and a control circuit for producing a control signal which is dependent on the detection signal. The control signal is applied to the control coil of the optical focusing device.

Such a focusing system has been proposed previously for use in a video disc player. The optical element which oscillates at high frequency and which cooperates with the radiation beam was formed by the objective itself. For this purpose a high-frequency oscillation was applied to the electrodynamic drive means for controlling the coarse position of the focusing plane, so that the complete objective and thus the focusing plane could effect a high frequency oscillation with small amplitude about the coarse position of the focusing plane. The focusing system is included in a tracking system which ensures that the focusing plane constantly follows the information plane of the record carrier, for example, of a video disc. Video discs are never perfectly flat so that during playing of a video disc the distance from the information plane to the objective will change continuously, which by means of the automatic focusing system must be compensated for by movements of the objective. The automatic focusing system is one of the control systems which are necessary in an optically operating video player, in which consequently no contact exists between the rotating video disc and the section of the player which scans the information on the video disc. In addition to the automatic focusing system an automatic tracking system is needed in view of the oscillations of the information track during playing of a video disc. The previously proposed automatic optical focusing system bears great resemblance to a tracking system known from the article "Ein Bildplattensystem mit Laseraufzeichnung," Funkschau 1974, Heft 25, 3041–3044.

In this system the radiation beam is concentrated on the information track of a video disc with the aid of a tracking mirror system and a number of optical elements. The radiation beam which has been modulated by the information on the disc is subsequently read with the aid of a photodiode, i.e., the photodiode converts the modulation of the light intensity of the radiation beam into a voltage modulation which is applied to appropriate electronic means for obtaining a suitable video and audio signal. The output signal of the photodiode is also used for tracking control, which as previously stated serves to keep the read spot of the radiation beam constantly aimed at the information track. An oscillating mirror, which oscillates with a high frequency, which mirror reflects the radiation beam from the light source before it reaches the video disc, imparts small periodic excursions to the read spot in a direction transverse to the information track. These high-frequency movements of the read spot give rise to high-frequency low-amplitude variations of the light intensity of the modulated radiation beam which is picked up by the photo-diode. The amplitude of these high frequency light variations, as well as their phase relationship with the oscillatory motion of the oscillating mirror, provide information about the degree and the direction of the deviation from the desired coarse position of the read spot. This information is obtained electronically by means of a so-called synchronous detection device, i.e., a phase sensitive rectifier, which produces a signal which is applied to the tracking mirror for readjusting the tracking mirror so as to correct the coarse position of the read spot of the radiation beam relative to the information track.

In this known tracking mirror device the oscillating mirror is arranged on a piezo-ceramic resonator, which is energized by means of an oscillator with a fixed frequency. The oscillator signal, which has a frequency of approximately 20 kHz, is also fed to the synchronous detection device for detection of the phase relationship of the oscillator signal and the high-frequency signal obtained from the photodiode.

It is an object of the invention to provide an automatic optical focusing system of the type mentioned in the preamble, where in contradistinction to the described, previously proposed focusing system the objective itself need not be moved at a high frequency in an axial direction, which demands a substantial power and is comparatively difficult with respect to its construction, while moreover the components of the objective are subjected to a high-frequency oscillation, which is frequently considered undesirable. The invention is characterized in that the oscillating optical element of the focusing device comprises an oscillating mirror which reflects the radiation beam, which mirror comprises a base with a reflecting surface and which is adapted to effect high-frequency bending oscillations, at least one component of the prevailing bending oscillation having the direction of the reflected part of the radiation beam. The mirror remotely resembles a similar mirror shown in U.S. Pat. No. 3,876,875.

Owing to the bending oscillations of the oscillating mirror the shape of the reflecting surface will change during the bending oscillations, so that the reflected light beam is converged or diverged by the oscillating mirror to an extent which constantly varies between a maximum and a minimum. Thus, the desired high frequency oscillation of the focusing plane about its coarse position is obtained.

Preferably the oscillating mirror has a substantially round base which effects high frequency bending oscillations between a convex and a concave shape. An oscillating mirror of this shape is adapted in an optimum manner to the round shape of the entrance pupil and the lenses used in the objective.

An embodiment which has the advantage that for driving the oscillating mirror a minimum amount of energy is required, is characterized in that the oscillating mirror is supported by supporting means which contact the oscillating mirror substantially at the location of a neutral zone of the oscillating mirror, i.e., a zone where the amplitude of the prevailing high-frequency bending oscillations is locally substantially zero. In such an embodiment the supporting means have a minimum damping and counteracting effect on the oscillating mirror.

A further embodiment has the advantage that the oscillating mirror need not be driven by an oscillator which is tuned to a fixed frequency. This embodiment is characterized in that on the oscillating mirror outside the neutral zone, an electrical acceleration transducer is disposed which is electrically connected to the input of an amplifier whose output in its turn is electrically connected to the drive coil of the oscillating mirror. By an appropriate choice of the maximum amplitude of the voltage applied to the drive coil and, as the case may be by the use of phase-shifting networks, a loop can thus be obtained in which such a phase shift occurs that it becomes unstable and oscillates at its natural frequency and which will sustain the bending oscillations of the mirror.

It is advantageous to employ an embodiment which is characterized in that the acceleration transducer comprises a piezo-electric crystal, which is mounted on the oscillating mirror, as well as an auxiliary mass which is secured to the crystal. Such an acceleration transducer can be of very compact construction and is suitable for the object in view. Preferably, the acceleration transducer is connected to the oscillating mirror at a location where the bending oscillation has substantially the maximum amplitude. In the case of the previously discussed round oscillating mirror the acceleration transducer is preferably arranged at the side opposite the reflecting surface near the center. This point may not have the maximum amplitude, but such an embodiment yields the additional advantage of a symmetrical construction.

The invention offers the possibility of a very advantageous embodiment which is characterized in that the oscillating mirror also functions as pivoting mirror in a combined electrodynamically controllable pivoting oscillating mirror device, which comprises a pivoting mirror device, known per se, for pivoting a reflecting surface under the influence of electrical control signals about at least one axis parallel to the reflecting surface for radially and/or tangentially following a circular or spiral information track on a rotating record carrier with a read spot. Since in this embodiment the mirror is employed for different purposes, namely first of all as pivoting mirror for radial and/or tangential tracking and secondly as oscillating mirror for automatic focusing, a compact and comparatively simple solution is obtained. In accordance with one embodiment such a combined oscillating-pivoting mirror can be supported by supporting means which at some distance from the mirror are connected to a supporting element which is pivotably journalled so as to obtain the pivotal movements. Thus a comparatively simple construction of the oscillating pivoting mirror is obtained, while preventing the bearing arrangement from influencing the high frequency oscillation or vice versa.

Figure 2:
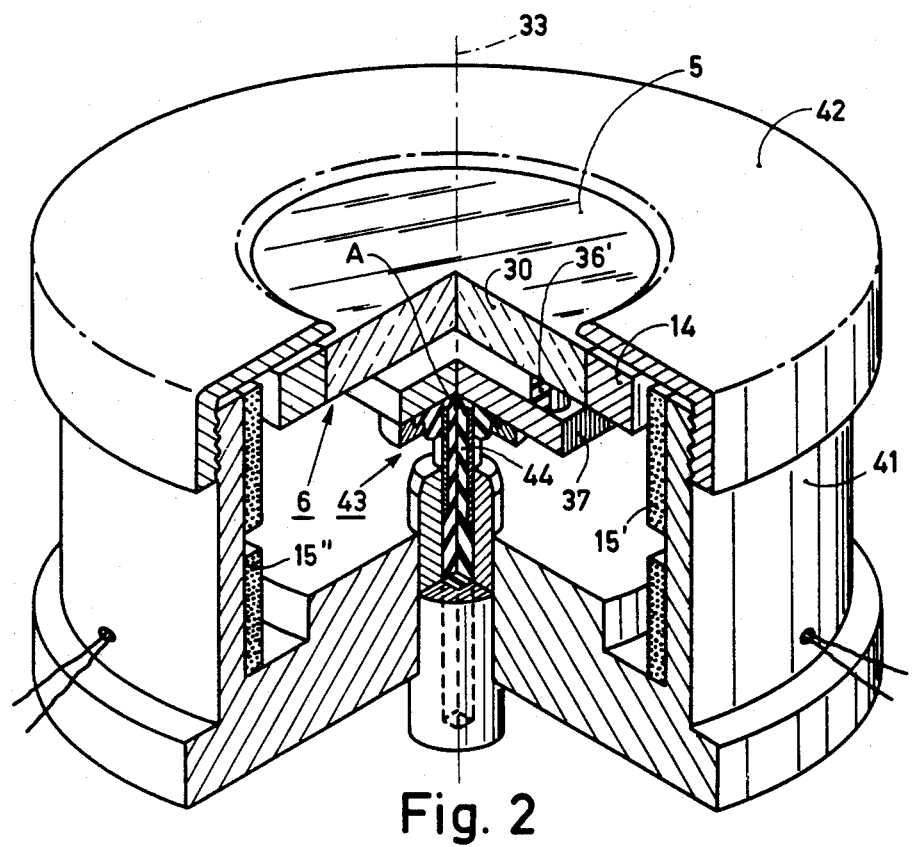
Figure 3:
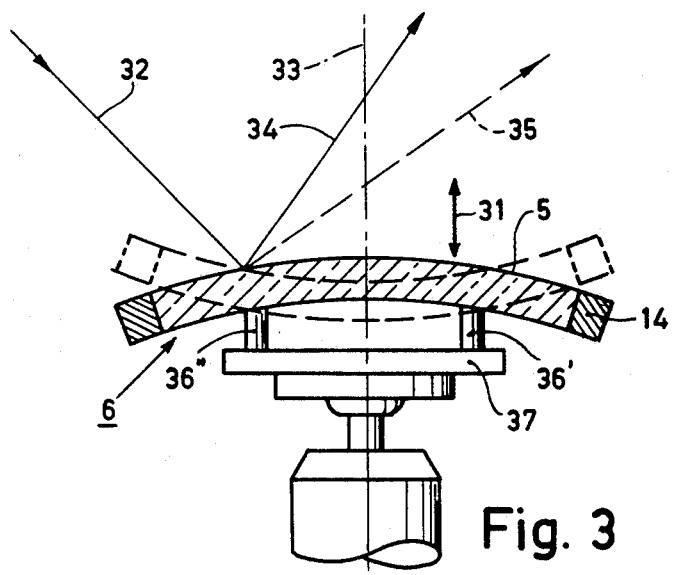
Figure 4:
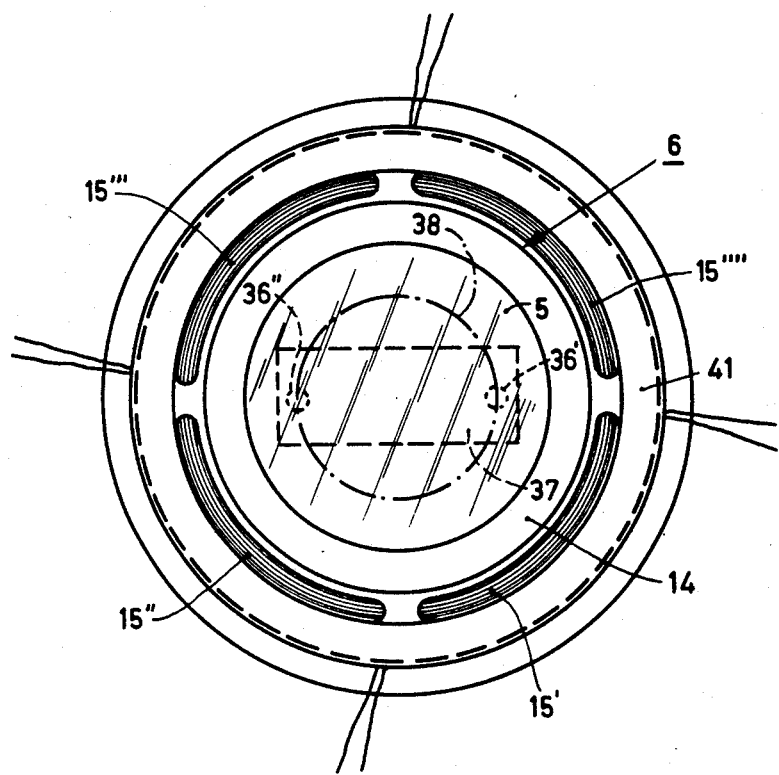

The invention will now be described in more detail with reference to the drawing, in which FIG. 1 shows a diagram of the automatic optical focusing system in accordance with the invention as employed in a video disc player, FIG. 2 is a perspective side view, partly in cross-section, of an embodiment of a combined pivoting-oscillating mirror device with a round pivoting-oscillating mirror, FIG. 3 schematically and on a highly exaggerated scale represents the change in shape to which the round pivoting-oscillating mirror of FIG. 2 is subjected during the high-frequency oscillations, and FIG. 4 shows a plan view of the pivoting oscillating mirror device of FIG. 2, a threaded cap at the top of the device being removed for the sake of clarity.

The diagram of FIG. 1 shows a radiation source 1, for example, a laser. This laser produces a radiation beam 2 which via a lens 3, a semi-transparent mirror 4 and the reflecting surface 5 of the oscillating pivoting mirror 6 and a focusing objective 7 is concentrated to a read spot 10 at the information surface 8, which will roughly coincide with the information plane, of a rotating record carrier, i.e., a video disc 9. With the aid of a drive spindle 11 the video disc can be rotated at a speed of 1500 or 1800 revolutions per minute, depending on whether the mains frequency is 50 or 60 Hz. For more general information with respect to a video disc player as well as video discs of the type which is also intended in FIG. 1, where the information surface is located in the disc and the radiation beam should traverse a transparent portion 12 before reaching the information surface, reference is made to the article "The Philips VLP-system," Philips Technical Review 33, 178–193, No. 7 (herewith incorporated by reference).

Of the optical focusing device which forms part of the automatic optical focusing system only the objective 7 and a control coil 13 are shown schematically. For more information relating to a suitable embodiment of an optical focusing device reference is also made to the above article, as well to applicant's U.S. pat. application Ser. No. 568,623, filed Apr. 16, 1975 now U.S. Pat. No. 4,021,101 (herewith incorporated by reference).

The read spot 10 is obtained by the focusing device 7 by focusing of the radiation beam 2 in an (imaginary) focusing plane. In the diagram shown in FIG. 1 the focusing plane coincides with the information surface 8 of the video disc in the present diagram. The optical element which cooperates with the radiation beam 2, which element oscillates at high frequency, and which causes the focusing plane to oscillate about its coarse position with a small amplitude and a high frequency, is formed by the pivoting-oscillating mirror 6. This mirror is driven with a high frequency by means of an electrodynamic drive system which comprises an annular magnet 14 as well as a drive coil 15. These and similar constructional details of the pivoting-oscillator mirror device will be further discussed with reference to FIGS. 2 and 4.

The information surface 8 of the video disc is reflecting. Via the objective 7 the reflected radiation beam is reflected to the oscillating-pivoting mirror 6 and via the surface of the semi-transparent mirror 4 it reaches a radiation-sensitive detector 16 which responds to the beam of radiation which has been modulated by the information track. This detector serves for producing a detection signal which depends on the position of the focusing plane relative to the information plane, which is broadly the same as the surface 8. This detection signal is symbolically represented by means of the arrow 17. The detector 16, in addition to the detection signal 17 also supplies an output signal 18 which contains the information from the video disc and which is applied to electronic means which process the video information and also the audio information further in a suitable manner.

The photodiode 16 forms part of a control circuit which in addition to the photodiode comprises a number of other elements namely: a phase-sensitive rectifier circuit SD (to be called synchronous detector hereinafter), and electronic controller 19, an amplifier 20, the control coil 13, and the objective 7.

The self-oscillating loop for producing the high-frequency bending oscillations of the pivoting oscillating mirror 6 comprises the following elements: The pivoting-oscillating mirror 6 itself, a piezo-ceramic acceleration transducer 21, an amplifier 22, an amplitude-limiting network 23, a phase-shifting network 24, an amplifier 25, and the high-frequency drive coil 15. The various elements of this self-oscillating loop are adapted to each other in a manner which is obvious to those skilled in the art, such that the bending oscillation of the pivoting-oscillating mirror 6 is sustained by means of the high-frequency drive coil 15. The output signal 26 of the amplifier 25 is applied to the high frequency drive coil 15 and to a second phase-shifting network 27, whose output signal 28 serves as second input signal for the synchronous detector SD.

In respect of its magnitude the output signal 29 of the synchronous detector depends on the magnitude of the high frequency component of the signal supplied by the detector 16 and in respect of its polarity, which may be positive or negative, it depends on the phase-relationship between the signals obtained from the oscillating loop, i.e., the output signal 26 of the amplifier 25 and the high-frequency component of the output signal 17 of the detector 16. Via the electronic controller 19 and the amplifier 20 this output signal is applied to the control coil 13 for correcting the coarse position of the objective 7.

FIGS. 2 and 4 show a possible embodiment of an oscillating-pivoting mirror device which could be used in an automatic optical focussing system in accordance with FIG. 1. The oscillating optical element, as previously stated, comprises the oscillating pivoting mirror 6. This mirror consists of a quartz base 30 on which a reflecting layer is deposited which is so thin that no attempt has been made to show it in the Figure. This oscillating-pivoting mirror is substantially round and is adapted to effect high-frequency bending oscillations between a convex and a concave shape, see in particular FIG. 3. In this last mentioned Figure the round oscillating-pivoting mirror 6 is represented exaggerated in its two extreme bending positions, namely in its most concave shape by the uninterrupted line and in its most convex shape by interrupted lines. Each point of the reflecting surface (save the points situated in a neutral zone to be discussed later), effects to-and-fro movements in the direction of the double arrow designated 31. A single light ray 32 of the laser beam 2 impinges on the mirror at an angle of approximately 45° with the neutral optical axis 33. This is the normal to the reflecting surface 5 and it passes through the center of the oscillating-pivoting mirror in the absence of bending oscillations. The ray which is reflected in the case of the maximum convex shape of the oscillating-pivoting mirror is represented by the uninterrupted line and is designated by the reference numeral 34, while the ray which is reflected in the case of maximum concave curvature of the oscillating mirror is represented by an interrupted line and is denoted by the reference numeral 35. It will be evident from the drawing that at least a component of the bending oscillation, which has the direction 31, has the direction of the reflected rays 34 and 35.

The oscillating pivoting mirror 6 is supported by supporting means 36' and 36". When in the continuation of the description these identical supporting means are discussed the accent will be omitted. The same applies with respect to other mutually identical parts such as the four coils 15, which in FIG. 4 are identified with the aid of accents.

The supporting means 36 consist of a rubber which adheres to the base 30 and to a supporting plate 37. They make contact with the oscillating-pivoting mirror 6 substantially at the location of a circular neutral zone which in FIG. 4 is denoted by the reference numeral 38. At the location of this circular zone the amplitude of the prevailing high-frequency bending oscillation is substantially zero, so that the supporting means 36 have a minimal effect on the oscillating movement of the oscillating-pivoting mirror and cause minimal damping.

On the underside of the base 30, i.e., on the side opposite the reflecting surface 5, a piezoceramic acceleration transducer may be mounted near the center of the oscillating-pivoting mirror. This is not shown in the drawings, but this may be effected in a manner obvious to those skilled in the art, for example, by bonding or glueing. As is shown in FIG. 1, the piezoelectric acceleration transducer may comprise a piezoelectric crystal 39 which is mounted on the mirror 6 with the aid of an adhesive and onto which, also by glueing, an auxiliary mass 40 may be fixed. The compressive and tensile stresses which occur in the crystal 39 during the oscillations produce electrical signals which are proportional to the acceleration of the auxiliary mass 40 and thus to the acceleration of the oscillating-pivoting mirror 6.

As previously stated the device of FIGS. 2 and 4 constitutes a combined oscillating-pivoting mirror device. In addition to the oscillating-pivoting mirror 6, the supports 36, and the supporting plate 37 this device also comprises a substantially cylindrical housing 41, a threaded cap 42, and a bearing arrangement 43, for the oscillating-pivoting mirror. The housing 41 consists of aluminium and at its inside it accommodates the control coils 15 which are bent into the shape of a quarter-cylinder. These control coils cooperate with the annular diametrically magnetized permanent-magnetic ring 14 which is glued to the circumference of the base 30 of the oscillating pivoting mirror 6. By means of the four control coils 15 the oscillating-pivoting mirror 6 can be pivoted about every axis perpendicular to the neutral optical axis 33 and passing through a fictitious bearing point A. These pivotal movements may be regarded as pivotal movements about two pivoting axes which are mutually perpendicular, the pivotal movements about the one pivoting axis being produced by the two control coils 15' and 15''' and those about the other pivoting axis by the two control coils 15″ and 15″″. For the high frequency bending oscillation of the oscillating-pivoting mirror the same high frequency signal should be applied to the four coils 15 at the same time. In FIG. 1 the four coils 15′ through 15″″ are jointly represented by the single coil 15. The pivotal movements about said two mutually perpendicular pivoting axes are intended for radial and tangential tracking of the information track on the video disc. The construction of the bearing arrangement 43 will not be discussed in further detail, but for this reference is made to the applicant's previous U.S. Pat. application Ser. No. 653,480, filed Jan. 29, 1976 now U.S. Pat. No. 4,021,096 (herewith incorporated by reference). For the correct understanding of the present oscillating-pivoting mirror device it suffices to note that said bearing arrangement comprises a silicon rubber compound 44 by means of which the pivoting mirror is elastically mounted. In fact, the bearing arrangement 43 enables the supporting plate 37 to be pivoted, but the oscillating pivoting mirror is connected thereto by means of the support 36, so that the pivotal movements of the supporting plate 37 are transmitted to the oscillating pivoting mirror 6. The high-frequency oscillations of the oscillating pivoting mirror are not transmitted to the supporting plate 37 and the bearing arrangement 43 because, as previously stated, the supports 36 are disposed at the location of the neutral zone 38 of the oscillating pivoting mirror. Thus, the supporting plate 37 and the bearing arrangement 43, as well as the other parts of the oscillating-pivoting mirror device, are isolated from the high-frequency oscillations of the oscillating pivoting mirror 6.

What is claimed is:

1. An automatic focusing system for a disc player system comprising means for projecting a radiation beam onto a moving surface of a rotating disc that is optically encoded with information thereby modulating the radiation beam with said encoded information; radiation-sensitive means for converting the modulated beam from the disc into a focusing error signal and into an electrical output signal corresponding to said information; optical focusing means comprising lenses axially movable in the path of the radiation beam from the projecting means for focusing the radiation beam to a read spot in an imaginary focusing plane including said optically encoded moving surface of the disc in response to said focusing error signal; and an oscillating mirror in the path of the radiation beam from said projecting means between the projecting means and the disc and comprising a base having a reflecting surface, and means for producing bending periodic oscillations in said reflecting surface, said oscillations having a component in the direction of the radiation beam reflected from said reflecting surface of said oscillating mirror.

2. A system as recited in claim 1, further comprising an electrical acceleration transducer on the oscillating mirror outside the neutral zone, drive coil means magnetically coupled to said mirror for moving said mirror in response to electrical signals, an amplifier having an input connected to the output of said acceleration transducer and having an output connected to said drive coil means for providing said electrical signal to said drive coil means, said acceleration transducer, said amplifier and said drive coil means comprising a positive feedback loop for sustaining said mirror oscillations.

3. An automatic focusing system as claimed in claim 2, wherein the acceleration transducer comprises a piezoelectric crystal which is fixed to the oscillating mirror, and an auxiliary mass which is disposed on the crystal.

4. An automatic focusing system as claimed in claim 2, wherein the acceleration transducer is connected to the oscillating mirror at a location where the bending oscillation has substantially the maximum amplitude.

5. An automatic focusing system as claimed in claim 2, wherein the acceleration transducer is connected to the oscillating mirror at the side which is disposed opposite the reflecting surface.

6. A system as recited in claim 1, wherein said information is recorded in the form of spiral tracks on said disc, wherein said radiation-sensitive means further comprises means for converting said modulated beam from said disc into a tracking error signal, and wherein said oscillating mirror further comprises means responsive to said tracking error signals for pivoting said radiation beam from said radiation source radially with respect to said disc to correct tracking errors.

7. A system as recited in claim 1, wherein said information is recorded in the form of spiral tracks on said disc, wherein said radiation-sensitive means further comprises means for converting said modulated beam from the disc into a time base error signal, and wherein said oscillating mirror further comprises means responsive to said time base error signal for pivoting said radiation beam from said radiation source tangentially with respect to said disc to convert time base errors.

8. An automatic focusing system as claimed in claim 1, wherein the oscillating mirror has a substantially round base which effects high-frequency bending oscillations between a convex and a concave shape.

9. An automatic focusing system as claimed in claim 1, wherein the oscillating mirror is supported by supports which contact the oscillating mirror substantially at the location of a neutral zone of the oscillating mirror, said neutral zone comprising a zone where the amplitude of the prevailing high-frequency bending oscillation is locally substantially zero.

* * * * *